United States Patent
Bodas

(10) Patent No.: US 7,363,517 B2
(45) Date of Patent: Apr. 22, 2008

(54) METHODS AND APPARATUS TO MANAGE SYSTEM POWER AND PERFORMANCE

(75) Inventor: Devadatta V. Bodas, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 319 days.

(21) Appl. No.: 10/741,641

(22) Filed: Dec. 19, 2003

(65) Prior Publication Data

US 2005/0138438 A1 Jun. 23, 2005

(51) Int. Cl.
*G06F 1/26* (2006.01)
(52) U.S. Cl. ........................... 713/300; 713/320
(58) Field of Classification Search ............... 713/300, 713/320, 340; 455/561; 324/760
See application file for complete search history.

(56) References Cited

U.S. PATENT DOCUMENTS

| | | | | |
|---|---|---|---|---|
| 6,223,056 B1* | 4/2001 | Appel | .................. | 455/561 |
| 6,489,793 B2* | 12/2002 | Jones et al. | .................. | 324/760 |
| 6,925,573 B2* | 8/2005 | Bodas | .................. | 713/320 |
| 2002/0049920 A1* | 4/2002 | Staiger | .................. | 713/340 |
| 2003/0115491 A1* | 6/2003 | Williams et al. | .................. | 713/300 |
| 2004/0236969 A1* | 11/2004 | Lippert et al. | .................. | 713/300 |
| 2004/0268166 A1* | 12/2004 | Farkas et al. | .................. | 713/320 |

\* cited by examiner

*Primary Examiner*—Chun Cao
(74) *Attorney, Agent, or Firm*—Alan K. Aldous

(57) ABSTRACT

A current level of power consumption of a system is monitored by a power consumption controller. When the current level of power consumption exceeds power guidelines, the power consumption controller adjusts the power consumption of one or more components in the system at a time by at least one power consumption level. Adjusting such power consumption level may have an impact on the performance of the system. Various techniques may be used to reduce (ramp down) power consumption or allow increase (ramp up) in power consumption. A power management policy may use one or combination of such techniques in order to enable the system to deliver the high performance while still maintaining the power consumption of the system within the power guidelines.

8 Claims, 10 Drawing Sheets

METHODS AND APPARATUS TO MANAGE SYSTEM POWER AND PERFORMANCE

FIELD OF THE INVENTION

The present invention relates generally to field of system management. More specifically, the present invention relates to methods and apparatus for managing system power and performance.

BACKGROUND

In many computer systems, system power specification is based upon analytical models. Such analytical models make certain assumptions about the power consumption by various components in a system.

FIG. 1 is a block diagram illustrating a prior art power distribution system. The system 100 includes a power supply 115, which receives power input 110. The power input 110 may be a DC power source (e.g., power from a battery) or an AC power source (e.g., power from a wall outlet). The power supply 115 may distribute power to multiple components such as, for example, central processing unit (CPU) or processor 130, memory 140, chipset 150, adapters 160, I/O devices 170, etc. The power supply 115 may first distribute power to a voltage regulator 120 which then control power distributed to a component (e.g., processor 130). The rating or capacity of the power supply 115 may depend on the power consumption rating of all of the components and thus of the system 100. When the power consumption of the system 100 exceeds the rating of the power supply 115, the power supply 115 may shut down.

It may be difficult to predict the power consumption rating of each of the components in the system to accommodate all possible scenarios. New usage models, applications and data patterns make the prediction even more difficult. When a new usage model makes the components demand more power than what the power supply can provide, the power supply 115 and accordingly the system 100 may fail. Other factors may also be considered to predict the power consumption rating of a component. These factors may include, for example, variation in power consumption of a component manufactured by different vendors. The sum of the power consumption rating of all of the components may also be used to determine system power specification. The system power specification may then be compensated upward to give some safeguard. This compensated system power specification may then be used to select the appropriate rating for the power supply 115. For example, the power supply 115 may have a maximum rating that is a percentage (e.g., 20 percent) higher than the system power specification. Thus, the rating of the power supply 115 may be larger and more expensive than necessary.

Facility managers typically rely on the rating of the power supply 115 to determine the amount of power and cooling to be allocated to the system 100. For example, computer systems such as the system 100 are typically installed on in racks. The racks have limited power and cooling capability. The facility managers may use the rating of the power supply (normally specified on a name plate placed on the back of a system) to determine the number of systems that can go on a rack. With the system power specification (and thus the rating of the power supply) growing every generation, the number of systems that can be supported by a rack decreases. As a result, there may be empty spaces on the rack causing wastage of expensive data center space and infrastructure.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

For one embodiment, methods and apparatus to manage operating characteristics of a computer system is disclosed. The operating characteristics may include one or more of power consumption, thermal and/or cooling properties, and performance. For example, power consumption of a system may vary at different levels depending on power consumption of components in the system at any particular time. When the power consumption of the system violates a guideline, the power consumption of one or more components in the system may be adjusted.

Methods and apparatus for managing operating characteristics such as power consumption of a computer system are described herein in some embodiments. In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

The lack of methods to efficiently manage operating characteristics (e.g., power consumption, heat generation, etc.) of computer systems may limit the ability to fully utilize the capabilities of the systems and may result in inefficient use of the supporting infrastructures. Improved techniques to manage the operating characteristics of the computer systems may prevent system failure and may improve system performance. For one embodiment, the techniques may include dynamically allocating power to components in the systems. The dynamic allocation of power may also affect the thermal or heat generation of the components.

Receiving Power Consumption Information from Power Supply

Figure 1:
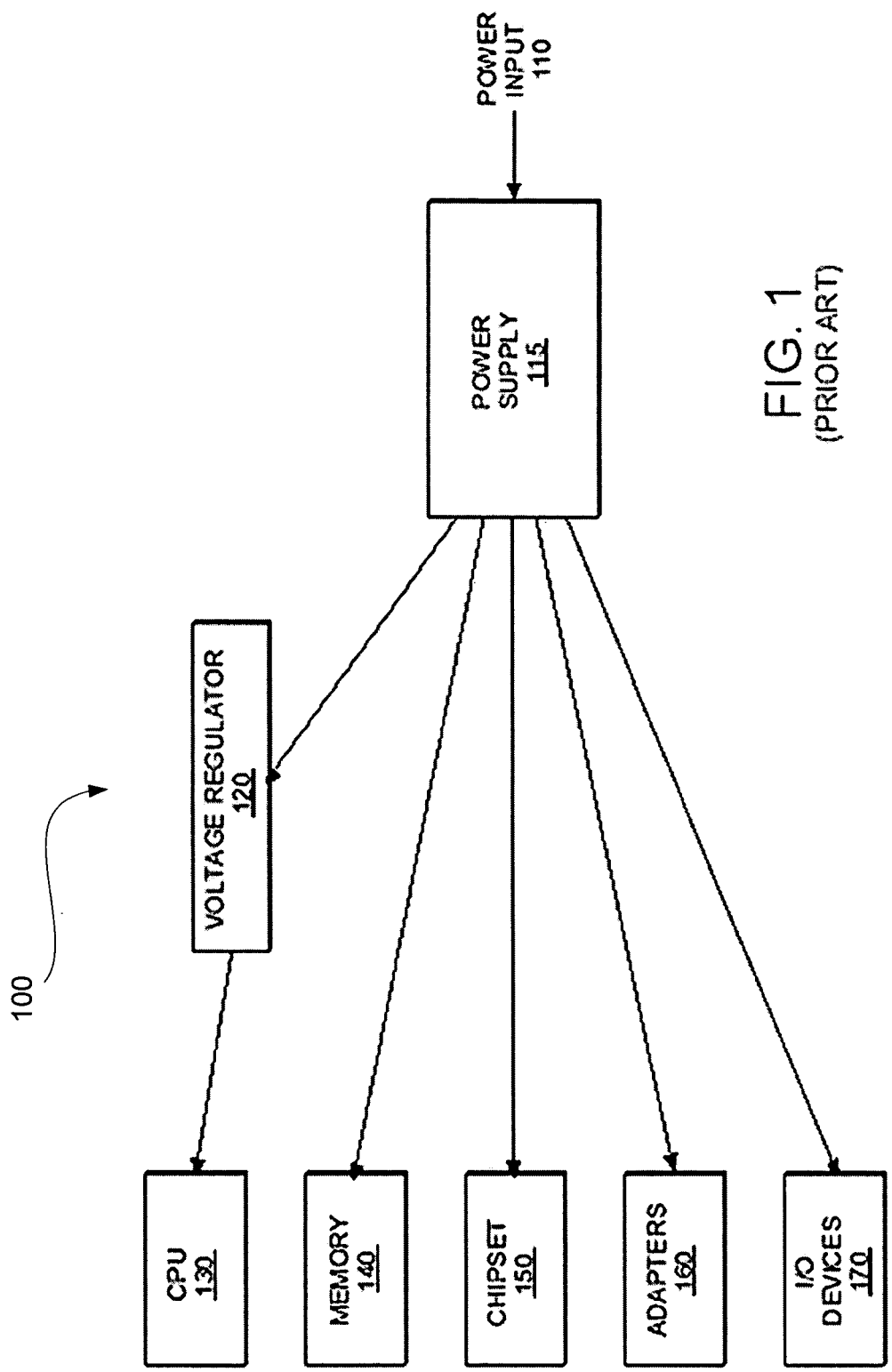
FIG. 1 is a block diagram illustrating a prior art power distribution system.
Figure 2:
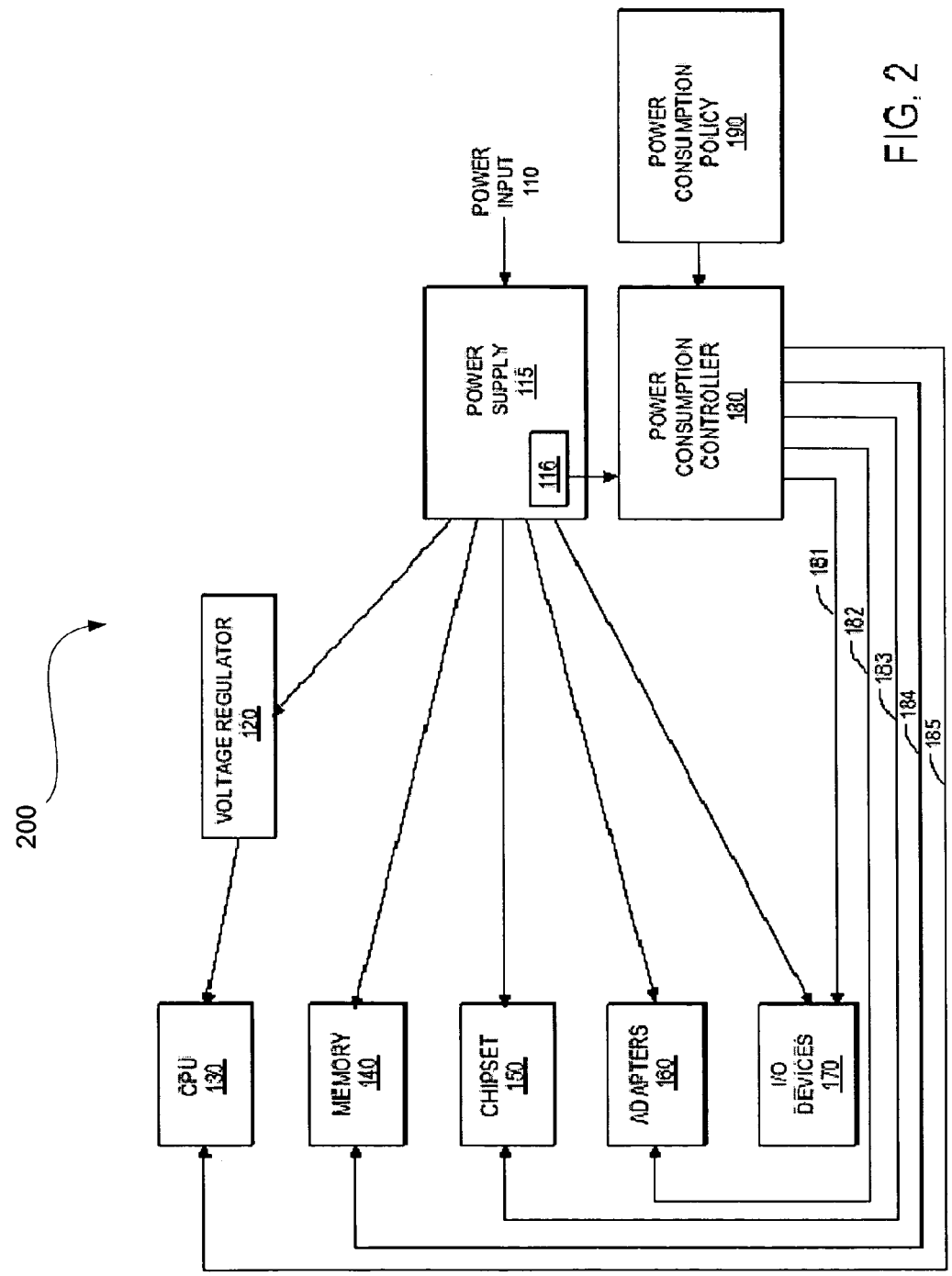
FIG. 2 is a block diagram illustrating one example of a power distribution system, in accordance with one embodiment.

FIG. 2 is a block diagram illustrating one example of a power distribution system, in accordance with one embodiment. The system 200 may include a power consumption controller 180. The power consumption controller 180 may be responsible for monitoring and managing the power consumption of the system 200 based on a power consumption policy 190. The power consumption policy 190 may include information that allows the power consumption controller 180 to take appropriate evasive action at appropriate times. The power consumption controller 180 may use information provided by the power consumption policy 190 to determine when the power consumption of the system 200 may cause the system 200 to fail.

For one embodiment, the power consumption controller 180 may monitor the power consumption of the system 200 by receiving information relating to a current level of power consumption of the system 200 from the power supply 115. For example, the power supply 115 may provide a port 116 to enable the power consumption controller 180 to extract the information relating to the current level of power consumption of the system 200. For one embodiment, the power consumption controller 180 may manage the power consumption of the system 200 by managing the power consumption of one or more components in the system 200. For example, when the current level of power consumption of the system 200 is too high, the power consumption controller 180 may use connections 181-185 to direct one or more of the components 130-170 to reduce their power consumption, if applicable.

Receiving Power Consumption Information from Components

Figure 3:
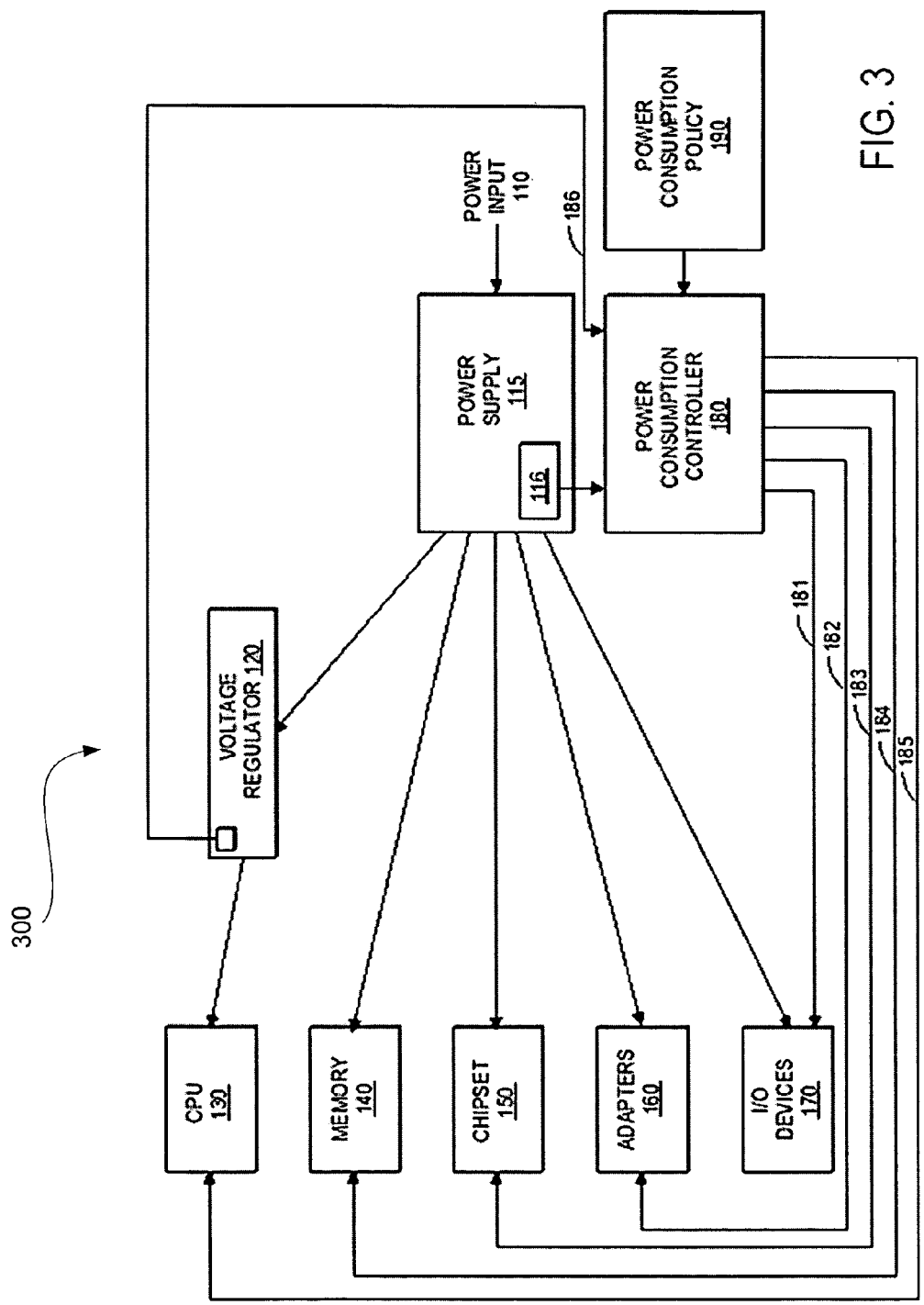
FIG. 3 is a block diagram illustrating another example of a power distribution system, in accordance with one embodiment.

FIG. 3 is a block diagram illustrating another example of a power distribution system, in accordance with one embodiment. For one embodiment, each of the components in system 300 may be capable of providing its own current level of power consumption. For example, referring to FIG. 3, the power consumption controller 180 may use the connections 181-185 to receive information relating to the power consumption from each of the components 130-170. The power consumption controller 180 may also use connection 186 to receive information relating to the power consumption of the voltage regulator 120.

For one embodiment, the power consumption controller 180 may be able to modify configurations of one or more components 130-170 in the system 300. For example, a component in the system 300 may have multiple operating points differing by power consumption levels, and the power consumption controller 180 may configure this component to operate in the different power consumption levels. It may be noted that configuring a component to operate in a different power consumption level may also change thermal property/characteristics or the amount of heat generated by the component from one thermal level to another thermal level. There may be different techniques used to configure a component to operate in the different power levels. For example, the power consumption of the processor 130 may be reduced by lowering the processor's P (lowering voltage/frequency or other methods) states or T (throttling) states. Changing the processor's P states is known to one skilled in the art. As another example, the power consumption of the memory 140 may be reduced by reducing the memory throughput, etc. One advantage of being able to configure a component to operate with reduced power level is the possibility of not having to power off the component.

Power Consumption Policy

The power consumption controller 180 may need to be aware of the existence of the components in the system 300. Because there may be situations when not all of the components in the system 300 may be configured to operate in different power consumption levels, the power consumption controller 180 may also need to know which of the components may be configured to operate in different power consumption levels and how they may be configured. For one embodiment, the power consumption policy 190 may provide information about the components that are installed in the system 300 and information about how these components may be configured to operate in the different power consumption levels.

Power Consumption Monitoring Process

Figure 4:
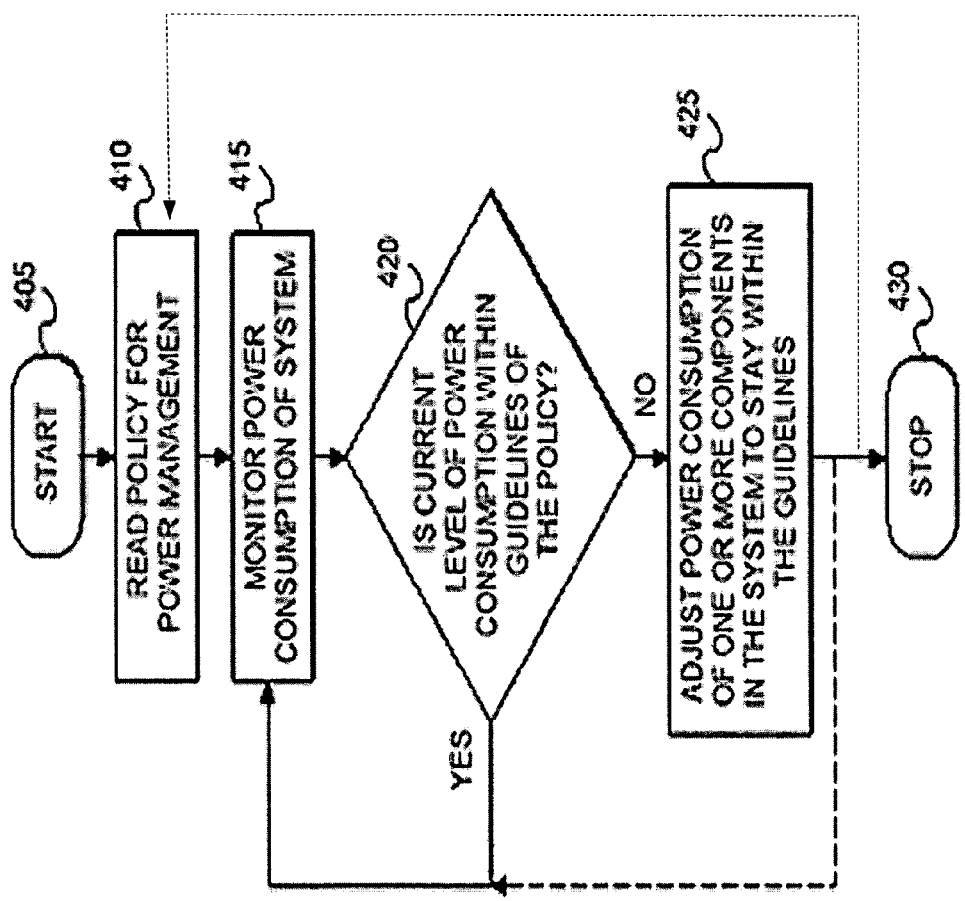
FIG. 4 is a flow diagram illustrating one example of a power consumption monitoring process, in accordance with one embodiment.

FIG. 4 is a flow diagram illustrating one example of a power consumption monitoring process, in accordance with one embodiment. The process may be performed by the power consumption controller 180 and may start at block 405. At block 410, the power consumption controller 180 reads the power consumption policy 190 for information that can be used to manage the power consumption of one or more components in a system. At block 415, the power consumption controller 180 monitors the current level of power consumption of the system. At block 420, a test is made to determine if the current level of power consumption of the system complies with power guideline specified by the power consumption policy 190.

The power guideline may provide a power hysteresis for the power consumption controller 180 to manage the power consumption of the system 300. For example, the power hysteresis may be a high power consumption threshold (e.g., 500 Watts). The high power consumption threshold (or high threshold) may be set by a user using an interface and becomes part of the power guideline. The power hysteresis may be static or it may be dynamic, as will be described in more detail. In this example, the power consumption controller 180 monitors the current level of power consumption of the system 300 to determine if the current level of power consumption of the system 300 complies with the power guideline (e.g., below or above the high threshold). When the current level of power consumption does not comply with the power guideline, an interrupt may occur and appropriate operations to reduce the power consumption of the system may be performed by the power consumption controller 180. It may be noted that the power hysteresis may be a range between the high threshold and a low power consumption threshold (or low threshold). The low threshold may be determined automatically depending on the power consumption policy being applied. There may be different power consumption policies. Each power consumption policy may set a different low power consumption threshold (e.g., 350 Watts). Alternatively, the low threshold may be set using by a user using an interface and becomes part of the power guideline. In this case, an interrupt may occur when the current level of power consumption of the system does not comply with the power guideline (e.g., exceeding the range between the high threshold and the low threshold).

Referring to FIG. 4, when the current level of power consumption of the system complies with the power guideline, the process flows from block 420 to block 415. However, when the current level of power consumption of the system does not comply with the power guideline, the process flows from block 420 to block 425 where the power consumption of one or more components is modified. This may help returning the current level of power consumption of the system to a level that complies with the power guideline. The process may stop at block 425 after one pass, or the process may flow from block 425 to block 415 for continuous monitoring of the current level of power consumption of the system.

For one embodiment, the process may flow from block 425 to block 410 to read the power consumption policy 190. This may be advantageous because the process may be able to accommodate dynamic change to the power consumption policy 190 and thus may enable dynamic power management by the power consumption controller 180. The dynamic change to the power consumption policy 190 may include change to the power hysteresis. For example, when the power hysteresis is changed, the power consumption controller 180 may be able to recognize the change when the process returns to block 410. This may cause the operations performed in block 420 to produce a different result. The example illustrated in FIG. 4 may stop at block 430.

Power Consumption Adjustment Process

Figure 5:
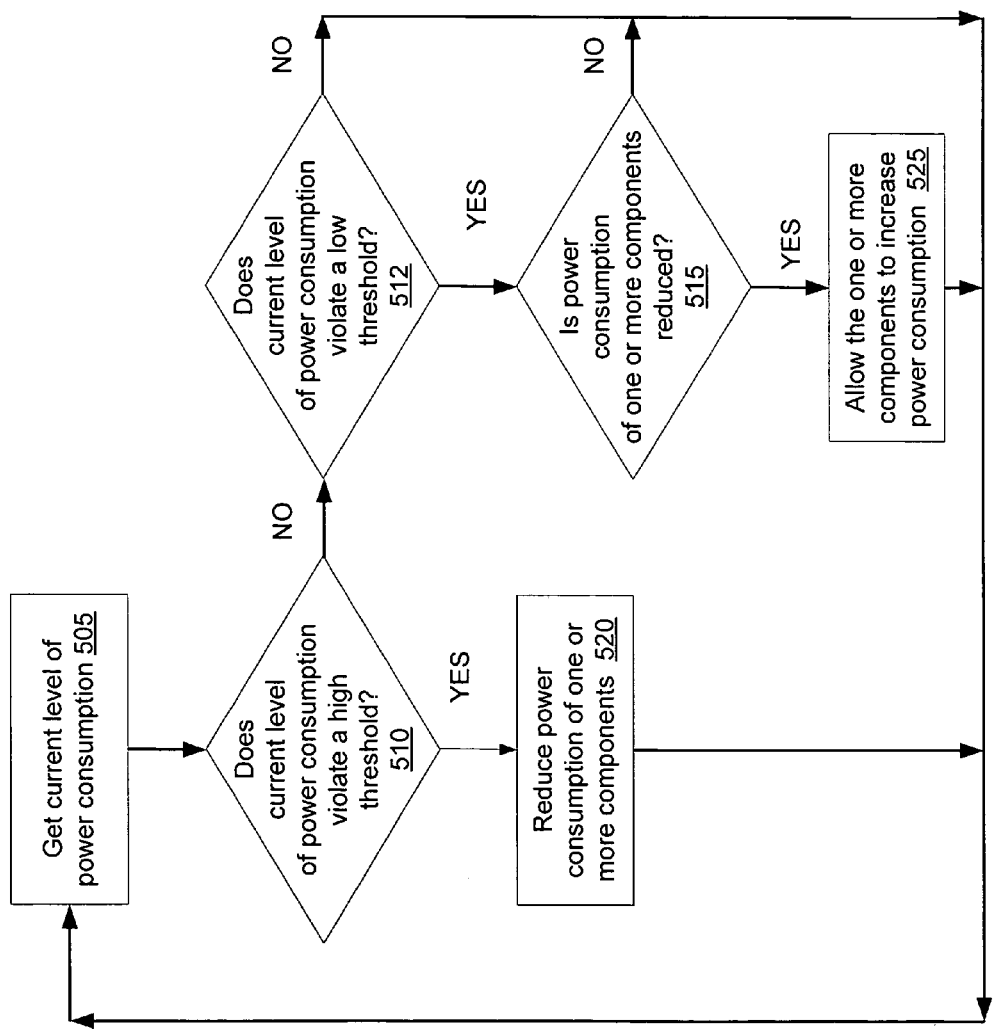
FIG. 5 is a flow diagram illustrating one example of a power consumption adjustment process, in accordance with one embodiment.

FIG. 5 is a flow diagram illustrating one example of a power consumption adjustment process, in accordance with one embodiment. The power consumption adjustment process describes the operation performed in block 425 of FIG. 4 in more detail. When a current level of power consumption of the system is determined not to comply with the power guideline which includes a power hysteresis, an interrupt or a warning may be generated. It may be noted that a warning may be associated with a potential power or thermal failure.

In this example, the current level of power consumption of the system is determined, as shown in block 505. At block 510, a test is performed to determine if the current level of power consumption exceeds or is above the high threshold. When it exceeds the high threshold, a high threshold warning may be generated and the process may flow from block 510 to block 520 where the power consumption of one or more components is reduced. For example, the power consumption controller 180 may configure the processor 130 to operate at a slower speed to reduce its power consumption. Note that there may be some delay to give time for the one or more components to change their power consumption. In this case, the power consumption controller 180 may wait before making a next determination of the current level of power consumption of the system, as is shown in block 505.

From block 510, when the current level of power consumption of the system does not exceed the high threshold, the process flows to block 512 where a test is performed to determine if the current level of power consumption is lower or below a low threshold. As mentioned above, the low threshold may be determined automatically, or it may be set by a user. When the current level of power consumption is not lower than the low threshold, no adjustment to the current level of power consumption may be necessary, and the process continues at block 505. From block 512, if the current level of power consumption is lower than the low threshold, the process flows to block 515 where a test is performed to determine if the power consumption of one or more components was previously reduced. This may have occurred if the operation in block 520 was previously performed. When there was no previous reduction of power consumption of any components in the system, the process flows from block 515 to block 505. This may indicate that the system experiences low power consumption due to current hardware and software configuration, and workload, and not by having the power consumption controller 180 reducing the power consumption of one or more components in the system. For example, this may occur when the system is not busy. However, from block 515, when there was a previous reduction of power consumption of one or more components by the power consumption controller 180, the process flows to block 525 where the power consumption of these components are allowed to increase. For example, the power consumption controller 180 may configure the processor 130 to operate at faster speed to increase its performance.

Figure 6:
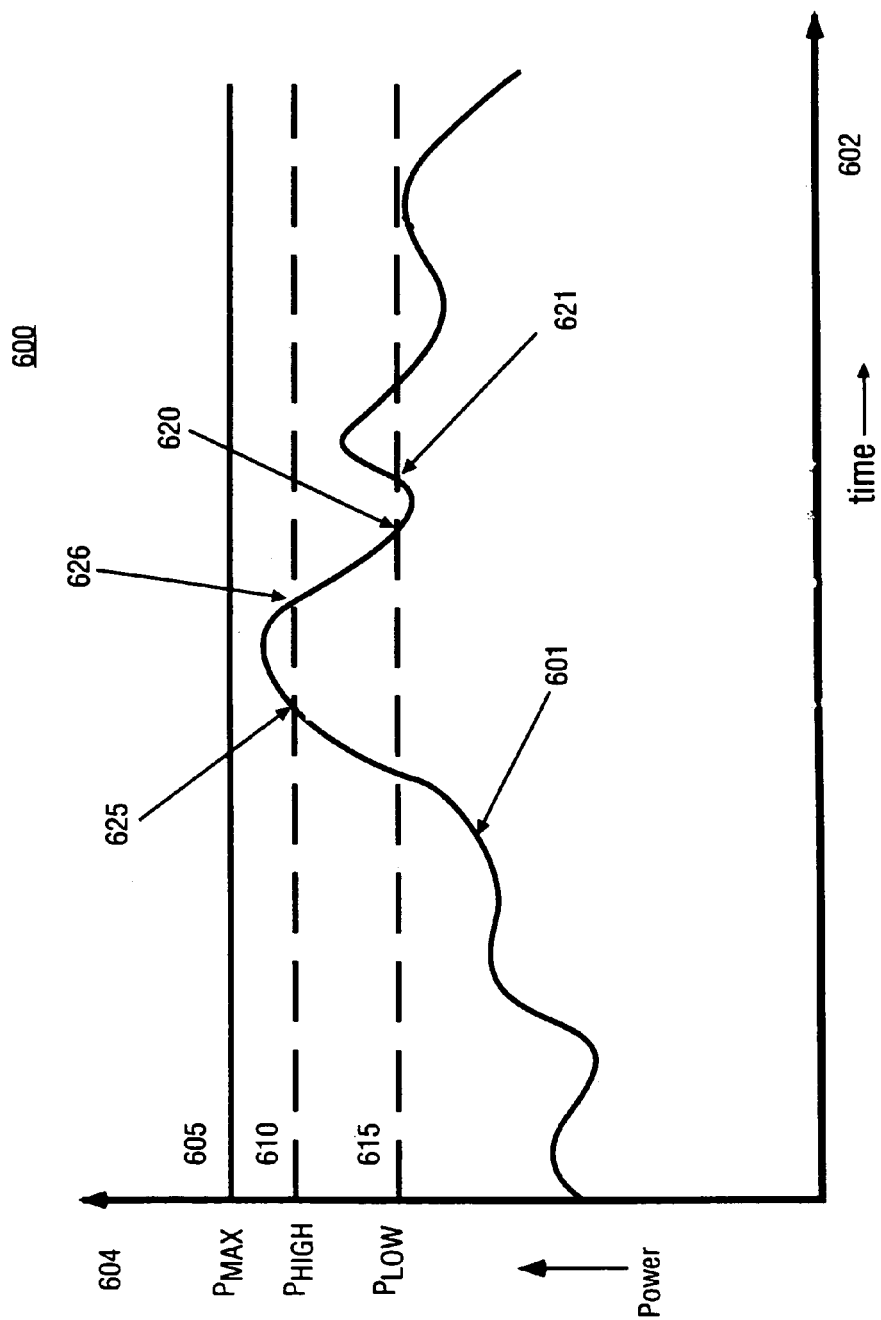
FIG. 6 is a graph illustrating one example of a current level of power consumption of a system over a period of time, in accordance with one embodiment.

FIG. 6 is a graph illustrating one example of a current level of power consumption of a system over a period of time, in accordance with one embodiment. Graph 600 includes a vertical axis 604 representing levels of power consumption of a system, and a horizontal axis 602 representing time. The curve 601 illustrates different levels of power consumption of the system over a period of time. The level P_HIGH 610 may represent a high threshold, and the level P_LOW 615 may represent a low threshold. The level P_MAX 605 may represent a maximum power level that can be supported by the power supply. For example, the level P_MAX 605 may be the rating of the power supply as specified by the manufacturer of the power supply. When the current level of power consumption of the system exceeds the level P_MAX 605 for a sustained period of time, the power supply may shut down.

The level P_MAX 605, the level P_HIGH 610, and the level P_LOW 615 may be provided by the power guideline. The power consumption controller 180 may use this information to manage the power consumption of the system and preventing it from exceeding the level P_MAX 605 for a sustained period of time. The range between the level P_LOW 615 and the level P_HIGH 610 may be considered to be the power hysteresis.

When the curve 601 reaches the level P_HIGH 610 at point 625, the power consumption of one or more components in the system is reduced. There may be a delay from when the curve 601 reaches the point 625 until the reduction of power consumption begins to reflect on the current level of power consumption of the system. This delay may cause the current level of power consumption of the system to exceed the level P_HIGH 610 for a short period of time, as illustrated between points 625 and 626, before the current level of power consumption returns to a level that is within the range (or comply with the power guideline).

Different techniques may be used to determine the level P_HIGH 610. For example, the level P_HIGH 610 may be determined by having the system executes one or more sets of software applications and then determining the level of power consumption. The one or more sets of applications may include, for example, applications that are typical for a certain industry segment (e.g., banking, insurance, etc.). This process of determining the levels of power consumption is referred to as power profiling. Alternatively, the level P_HIGH 610 may be set by a user, as described above.

When the current level of power consumption of the system is below the level P_LOW 615, no power consumption adjustment may be necessary if none of the components is operating in a reduced power mode. The system may be idle or doing little work. However, when the current level of power consumption of the system is below the level P_LOW 615, and one or more components in the system are operating in a reduced power mode, the power consumption of these components may be allowed to increase. For example, when the current level of power consumption of the system reaches the level P_LOW 615 at point 620, and the power consumptions of one or more components are allowed to increase. There may be a delay from when the curve 601 reaches the point 620 until the increase of power consumption begins to reflect on the current level of power consumption of the system. This delay may cause the current level of power consumption of the system to fall below the level P_LOW 615 for a short period of time, as illustrated between the points 620 and 621, before the current level of power consumption returns to a level that complies with the power policy.

Although the examples described herein may refer to controlling the power consumption of the one or more components, one skilled in the art may recognize that controlling the power consumption may directly or indirectly relate to controlling thermal characteristics and/or cooling characteristics of the system or of the one or more components in the system. For example, a thermal manager (not shown) may be coupled to the power consumption controller 180 to provide information to the power consumption controller 180 as to which component(s) the power consumption controller 180 is to adjust the power consumption.

Selective Reduction of Power Consumption—Ramp Down

When the current level of power consumption of the system exceeds the high threshold, operations to reduce the power consumption of the system may be performed. Similarly, when the current level of power consumption of the computer system is below the low threshold, operations to allow increase in the power consumption of the system may be performed. For one embodiment, these operations may be initiated using interrupts and performed using corresponding interrupt service routines.

A ramp-down policy may be used to selectively reduce the power consumption of one or more components. For one embodiment, the ramp-down policy may include information to enable the power consumption controller 180 to determine which components to scale back on their power consumption and how much to scale back. The ramp-down policy may enable the power consumption controller 180 to bring the current level of power consumption of the system to comply with the power guideline. This may cause some impact on the performance of the system. For one embodiment, the ramp-down policy may enable the power consumption controller 180 to reduce the overall power consumption of the system while keeping the impact to the performance of the system at a minimal.

Ramp Down—Apply to One Component at a Time

Figure 7:
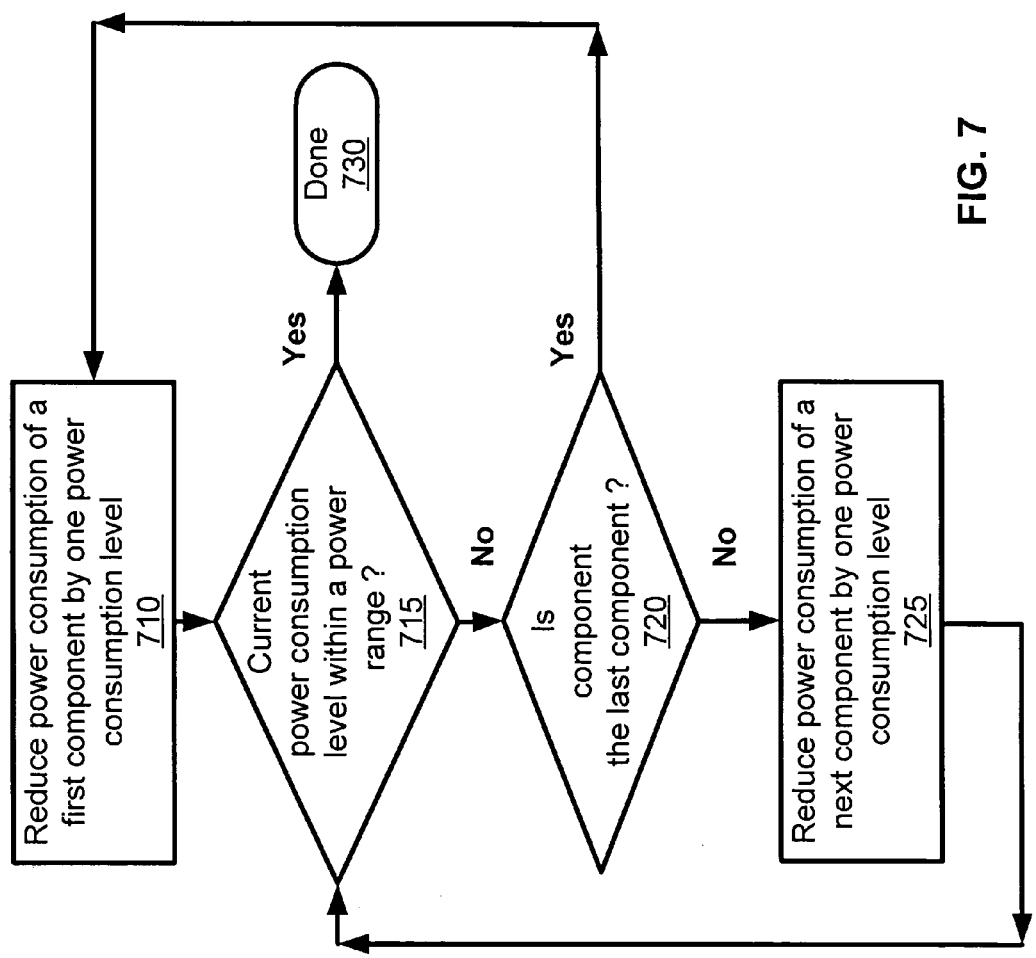
FIG. 7 is a flow diagram illustrating one example of a ramp-down process with one component at a time, in accordance with one embodiment.

FIG. 7 is a flow diagram illustrating one example of a ramp-down process which reduces the power consumption of one component at a time, in accordance with one embodiment. In this example, the process starts at block 710 where the power consumption controller 180 may first reduce the power consumption of one component among many components. For example, in a system that may include multiple processors (e.g., a server), when a high threshold warning occurs, the power consumption controller 180 may first reduce the power consumption of a first processor. This may include, for example, lowering the P state of the first processor.

At block 715, a test is performed to determine if the current level of power consumption of the system complies with the power guidelines. When it is, the process is done, as shown in block 730. For one embodiment, after the power consumption level of a last component is reduced by one level, and further power consumption reduction is necessary, the process may continue and repeat with the first component. In this situation, the process flows from block 720 to block 710 where the power consumption of the first component is reduced to a next level.

From block 720, when the component is not a last component, the power consumption controller 180 may then reduce the power consumption of the next component, as shown in block 725. For example, this may include lowering the P state of the next processor. This process may continue to block 715 until the current power consumption level of the system complies with the power guideline. For example, the system may include four processors Pr0 through Pr3, and each processor may support four P states P0 through P3, with P0 consuming the most power. Assuming that all four processors are operating in the P0 state when a high threshold warning occurs. The power consumption controller 180 may change the state of the processor Pr0 from P0 to P1. When the high threshold warning remains, the power consumption controller 180 may change the state of the processor Pr1 from P0 to P1, and so on. After the states of all of the processors have been changed from P0 to P1, and if the high threshold warning remains, the power consumption controller 180 may change the state of the processor Pr0 from P1 to P2, and so on. It may be possible that after the power consumption of a component is reduced, the current level of power consumption of the system may fall below the low threshold. In this case, a low threshold warning may occur and appropriate operations may be performed, as will be described. Of course, when the power consumption levels of all of the components have been reduced, and the current power consumption level of the system still exceeds the high threshold, an higher level of error or warning message may be generated.

Ramp Down—Apply to all Components at a Time

For one embodiment, instead of the power consumption controller 180 reducing the power consumption of one component in the system at a time, the power consumption controller 180 may reduce the power consumption of all components in the system one power consumption level at a time. For example, in a system that may include multiple processors Pr0 to Pr3, assuming that all four processors are operating in the P0 state when a high threshold warning occurs, the power consumption controller 180 may change the states of all of the processors Pr0 to Pr3 from P0 to P1 before verifying the current level of power consumption of the system.

Ramp Down—Apply to a Group of Related Components at a Time

For one embodiment, when a high threshold warning occurs, the power consumption controller 180 may reduce the power consumption of a group of components at a time. The group of components may have some common characteristics. The group of components may be associated with a particular hardware domain or may be associated with a particular workload. For example, the group of components may be related to or associated with a graphics controller of the system and may not be needed when the system is processing background applications.

Ramp Down—Reduce Multiple Levels at a Time

For one embodiment, instead of reducing the power consumption of a component one level (or P state in the case of a processor) at a time, the power consumption controller 180 may reduce the power consumption of the component at multiple levels at a time. This may accelerate the time it takes for the current level of power consumption of the system to return to a level that complies with the power guideline. Referring to the multiple-processors system example above, the power consumption controller 180 may change the state of the processor Pr0 from P0 directly to P3. This multiple-levels power reduction technique may be applied to one component at a time, all components at a time or a group of related components at a time.

Ramp Down—Apply to Redundant Component(s)

For availability and reliability purposes, many systems may have redundant components. The redundant components may be in a stand-by mode and may perform the same functions as their corresponding components that are not in the stand-by mode. Although being in the stand-by mode, the redundant components may consume power. For one embodiment, when a high threshold warning occurs, the power consumption controller 180 may reduce the power consumption of the redundant components. This may be performed by off-lining the redundant components. This may include powering down the redundant components. Off-lining or powering down the redundant components may remove the redundancy capability of the system. This redundancy power reduction technique may be applied to one redundant component at a time, all redundant components at a time or a group of related redundant components at a time.

Ramp Down—System in Critical State

When the number of high threshold warnings exceeds a set limit or when there are too many high threshold warnings within a period of time, or when the high threshold warning lasts for a long period of time, the system may be in a critical state and more drastic actions may need to be performed. For one embodiment, when the system is in the critical state, a forced thermal or power throttling of one or more components may be performed. This may include, for example, placing all components in a lowest power consumption or thermal state. For another embodiment, when the system is in the critical state, the power consumption controller 180 may off line one or more components. For example, in a multiple-processors system, a processor having low or no workload may either be placed in a lowest power consumption state or even be shut down. If further action is necessary, a graceful shut down of all of the components in the system may be performed.

Combinations of Ramp-Down Techniqes

Figure 8:
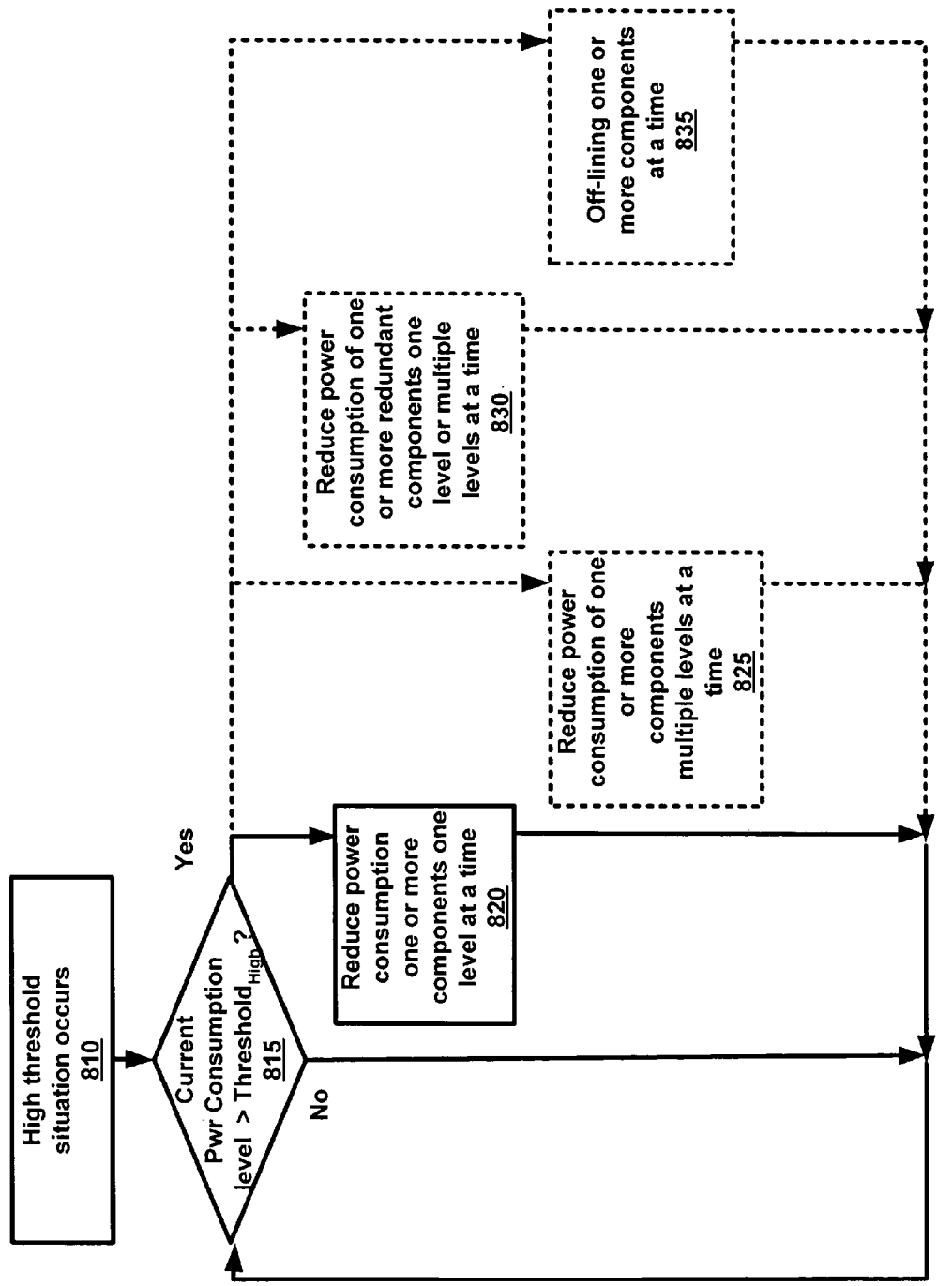
FIG. 8 is a flow diagram that illustrates examples of the different ramp-down techniques, in accordance to one embodiment.

FIG. 8 is a flow diagram that illustrates examples of the different ramp-down techniques, in accordance to one embodiment. In this example, the process is initiated when a high threshold warning occurs, as shown in block 810. At block 815, a test is performed to determine if the current level of power consumption of the system exceeds the high threshold. If not, the process may continue to monitor the current level of power consumption. When the current level of power consumption exceeds the high threshold, the process may move to block 820 to perform operations to reduce the power consumption of one or more components. Alternatively, the process may flow from block 815 to block 825, 830 or 835 (shown as dotted lines) to perform other operations to reduce the power consumption of one or more components. It may be noted that the operations described in blocks 820, 825, 830 and 835 may correspond to the ramp-down techniques described above. For one embodiment, these ramp-down techniques may be used individually or in combinations. Although not shown in FIG. 8, other ramp-down techniques described above may also be combined. For example, when a high threshold warning occurs, the process may flow from block 815 to block 820; however, at a second pass, when the high threshold warning remains, the process may flow from block 815 to block 825, etc.

The selection of combinations of the ramp-down techniques to reduce the power consumption of the system may depend upon system requirements, workload requirements, number of power consumption levels states, difference in power consumption of the power consumption levels or states, ability to sustain complexity and validation, etc.

Selective Adjustment of Power Consumption—Ramp Up

When the current level of power consumption of the system is below the low threshold, it may be because the workload is low, or it may be because the power consumption of one or more components in the system may have been previously reduced. For one embodiment, a ramp-up policy may be used to selectively allow the power consumption of one or more components to increase. The ramp-up policy may include information to enable the power consumption controller 180 to reduce or even eliminate restrictions on the components in order to enable the system to deliver as much performance as it is capable of delivering.

Ramp Up—Apply to One Component at a Time

Figure 9:
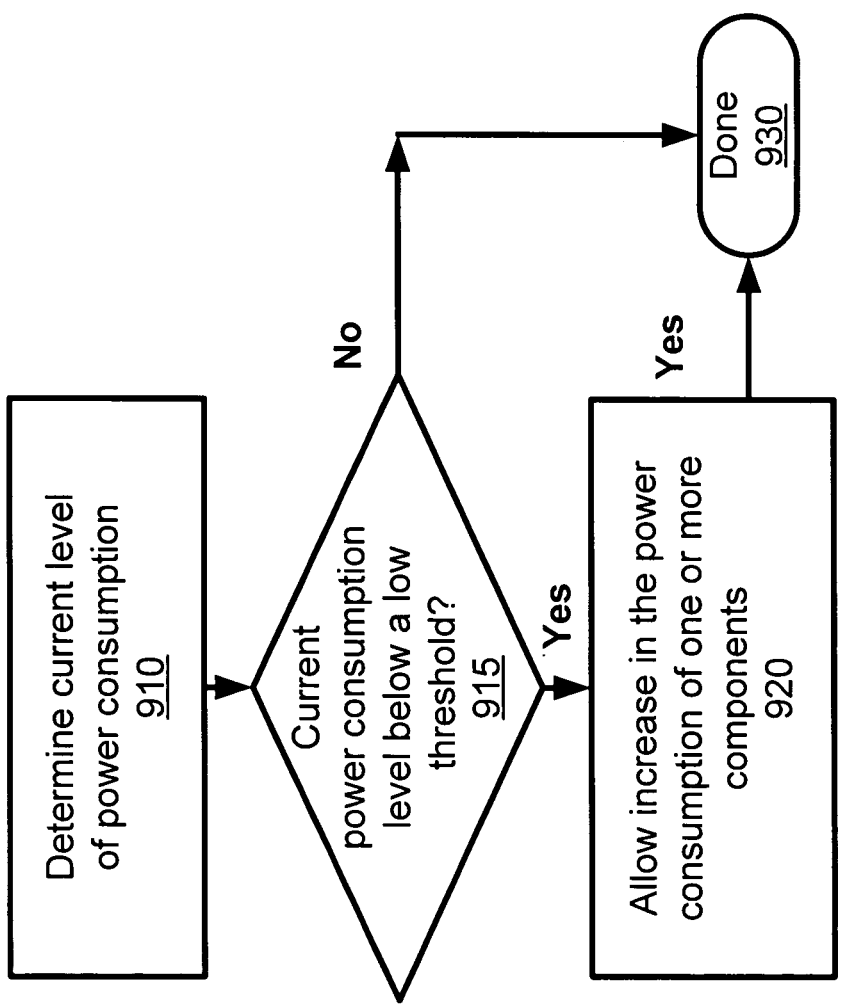
FIG. 9 is a flow diagram illustrating one example of a ramp-up process with one component at a time, in accordance with one embodiment

FIG. 9 is a flow diagram illustrating one example of a ramp-up process where power consumption is allowed to increase one component at a time, in accordance with one embodiment. The process is described starting at block 910 where a current level of power consumption of the system is determined. At block 915, a test is performed to determine if the current level of power consumption is below a low threshold. If it is not, the process is done, as shown in block 930. If the current level of power consumption is below the low threshold, the process flows to block 920 where the power consumption of one or more components in the system may be allowed to increase. The increase in power consumption may be allowed as long as the current level of power consumption of the system is below the high threshold. For one embodiment, the power consumption controller 180 may allow increase in the power consumption of one component in the system one level at a time. For example, in a system that may include multiple processors (e.g., a server), the power consumption controller 180 may first allow increase in the power consumption of a first processor (e.g., moving to a next P state). The current level of power consumption of the system may then be compared against the high threshold. If it is still below the high threshold, the power consumption controller 180 may then allow increase in the power consumption of a second processor, and so on. For well-distributed workloads, it may be possible that the power consumption controller 180 may allow increase in the power consumption of all processors in the system by bringing them to the same P state. For other situations, the power consumption controller 180 may move each processor from its current P state to a next P state.

Ramp Up—Apply to all Components at a Time

For one embodiment, when a low threshold warning occurs, all the components in the system may be allowed to increase in power consumption at a time. The power consumption of each of the components may be allowed to increase by one level. Using the multiple-processor system example above, when a low threshold warning occurs, the power consumption of each of the processors is allowed to be increased by one level. This may include, for example, increasing the P state for each processor to a next P state.

Ramp Up—Apply to a Group and Related Components at a Time

For one embodiment, when a low threshold warning occurs, the power consumption controller 180 may allow increase in the power consumption of a group of components in the system at a time. The power consumption of each of the components in the group may be allowed to increase by one level. The group of components may have some common characteristics. For example, the group of components may be associated with a particular hardware domain or may be associated with a particular workload.

Ramp Up—Allow to Increase Multiple Levels at a Time

For one embodiment, instead of allowing to increase the power consumption of a component one level (or P state in the case of a processor) at a time, the power consumption controller 180 may allow the increase in the power consumption of the component at multiple levels at a time. This may accelerate the time it takes for the system to reach a stage where it can deliver a performance level that it may be capable of delivering (e.g., maximum performance). Referring to the multiple-processors system example above, the power consumption controller 180 may change the state of the first processor from P3 directly to P0. This multiple-levels power increase technique may be applied to one component at a time, all components at a time or a group of related components at a time.

Ramp Up—Allow to Increase to Full Performance

For one embodiment, the power consumption controller 180 may allow increase in the power consumption of a component from a current power consumption level to a highest possible power consumption level that the component is capable of operating at. For example, when the processor Pr0 is operating at the P3 state, a low threshold warning may cause the power consumption controller 180 to bring the processor from the P3 state directly to the P0 state. The full-performance increase technique may be applied to one component, all components or a group of related components at a time.

Ramp Up—Apply to Redundant Component(s)

For one embodiment, when the system includes redundant components and the power consumption of these components have been reduced due to previous ramp-down operations, the power consumption of these redundant components may be restored when a low threshold warning occurs. This may also restore the availability and reliability status of the system. Restoring the power consumption of the redundant components may include, for example, bringing the components from an off-line state to an on-line state. This technique may be applied to one redundant component at a time, all redundant components at a time or a group of related redundant components at a time.

Ramp Up—Critical State

When the system is ramped down because it is in the critical state (i.e., too many high threshold warnings), the current level of power consumption of the system may be drastically reduced in a short time. This drastic reduction may bring the current level of power consumption of the system to below the low threshold. For one embodiment, when the low threshold warning occurs after a critical state ramp down, the power consumption controller 180 may first restore the components that have been off-lined or shut down. This increase in power consumption may be applied to one component at a time. The increase may be at one level at a time and may eventually restore the system to a higher performance state.

Combinations of Ramp-Up Techniques

Figure 10:
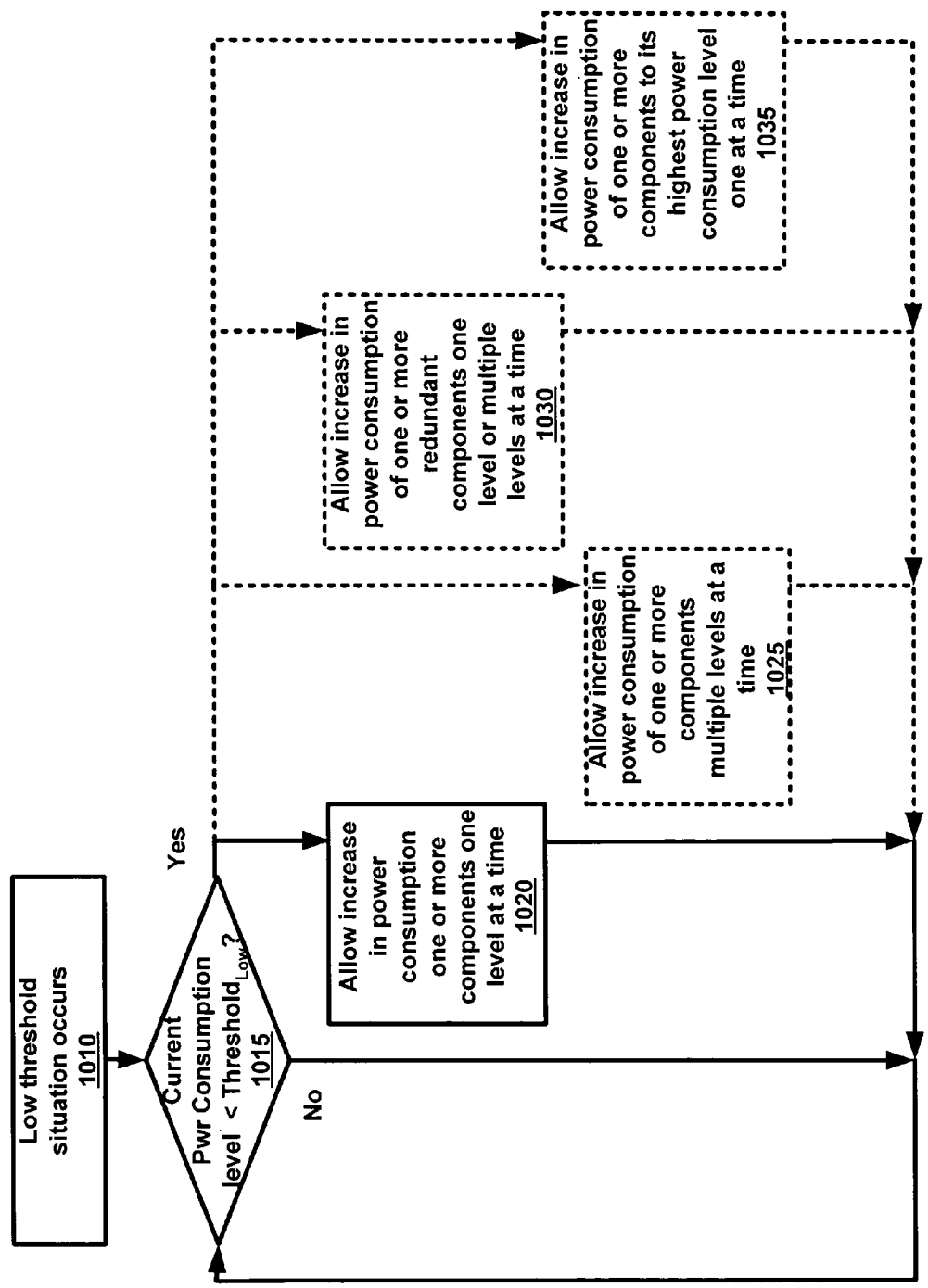
FIG. 10 is a flow diagram that illustrates examples of the different ramp-up techniques, in accordance to one embodiment.

FIG. 10 is a flow diagram that illustrates examples of the different ramp-up techniques, in accordance to one embodiment. In this example, the process is initiated when a low threshold warning (e.g., a low threshold interrupt) occurs, as shown in block 1010. At block 1015, a test is performed to determine if the current power consumption level is below a low threshold. If not, the process may continue to monitor the current level of power consumption of the system. When the current level of power consumption is below the low threshold, the process may move to block 1020 to perform operations to allow increase in the power consumption of one or more components. Alternatively, the process may move from block 1015 to block 1025, 1030 or 1035 (shown as dotted line) to perform different operations to allow increase in the power consumption of one or more components. Note that the operations described in blocks 1020, 1025, 1030 and 1035 may correspond to the ramp-up techniques described above. For one embodiment, these ramp-up techniques may be used individually or in combinations. Although not shown in FIG. 10, other ramp-up techniques described above may also be combined. For example, when the low threshold warning first occurs, the process may flow from block 1015 to block 1020; however, when the low threshold warning remains (e.g., the current level of power consumption is still below the low threshold), the process may flow from block 1015 to block 1025, etc.

The selection of combinations of ramp-up techniques may depend upon system requirements, workload requirements, number of power consumption levels states, difference in power consumption of the power consumption levels or states, ability to sustain complexity and validation, etc.

Computer Readable Media

The operations of the various methods of the present invention may be implemented by a processing unit in a digital processing system, which executes sequences of computer program instructions. The power consumption controller 180 may be implemented in software, in hardware or in a combination of both software and hardware. For example, the power consumption controller 180 may be implemented as a chip or chipset with hardware circuitry that includes an auxiliary processor dedicated to performing functions of power management. The chip or chip set may further include internal memory and bus connections to the components (e.g., system CPU, system memory, etc.) in the system. The chip or chipset may also include bus connection(s) to receive power consumption information.

As another example, the power consumption controller 180 may be an application software including instructions that are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the CPU (e.g., system processor).

In other cases, the instructions may not be performed directly or they may not be directly executable by the CPU.

Under these circumstances, the executions may be executed by causing the CPU to execute an interpreter that interprets the instructions, or by causing the CPU to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software or to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. For example, the ramp-down and ramp-up techniques described above may be used individually or in combinations. The power consumption controller 180 may apply at least one or more ramp-down techniques and at least one or more ramp-up techniques to enable the computer system to perform at a highest level possible under a particular circumstance while keeping the power consumption at a lowest level. In addition, although the examples may refer to a multiple-processors system, the ramp-up and ramp-down techniques may also be applicable to any system having one or more components that support multiple operating points at different levels of power consumption. Furthermore, the system described above may be a desktop or laptop computer system, a server computer system, a handheld device, a network device, a storage device, etc. Accordingly, the specification and drawings are to be regarded in an illustrative rather than a restrictive sense.

What is claimed is:

1. A method, comprising:
   determining a current operating characteristics of a system; and
   when the current operating characteristics of the system does not comply with a guideline, adjusting operating characteristics of one or more of components in the system by one operating level or by multiple operating levels at a time;
   wherein the current operating characteristics of the system includes a current level of power consumption of the system;
   wherein adjusting the operating characteristics of the one or more components in the system by at least one operating level at a time includes adjusting power consumption levels of the one or more components by at least one power consumption level at a time;
   wherein the guideline includes a high threshold, and wherein the current level of power consumption of the system does not comply with the guideline when the current level of power consumption exceeds the high threshold;
   wherein the guideline further includes a low threshold, and wherein the current level of power consumption of the system does not comply with the guideline when the current level of power consumption is outside a range between the low threshold and the high threshold;
   wherein adjusting the power consumption of the one or more components in the system comprises: when the current level of power consumption of the system is below the low threshold, allowing an increase in the power consumption of the one or more components by at least one power consumption level; and
   wherein the one or more components include a redundant component.

2. The method of claim 1, wherein allowing the increase in the power consumption of the one or more components by at least one power consumption level includes allowing increase in the power consumption of at least one component to its highest power consumption level.

3. The method of claim 1, wherein the power consumption of the one or more components is allowed to increase while the current level of power consumption of the system is below the high threshold.

4. The method of claim 3, wherein adjusting the power consumption of the one or more components in the system further comprises:
   when the current level of power consumption of the system is above the high threshold, decreasing the power consumption of the one or more components by at least one power consumption level.

5. The method of claim 4, wherein the power consumption of the one or more components is decreased while the current level of power consumption of the system is above the high threshold.

6. A computer readable medium having stored thereon sequences of instructions which are executable by a system, and which, when executed by the system, cause the system to perform a method, comprising: determining a current level of power consumption of a system; and when the current level of power consumption of the system does not comply with
   a guideline, adjusting power consumption of one or more of components in the system by one power consumption level or by multiple power consumption levels of one component at a time or multiple components at a time;
   wherein the guideline includes a high threshold and a low threshold, and wherein the current level of power consumption of the system does not comply with the guideline when the current level of power consumption of the system is outside a range between the low threshold and the high threshold;
   wherein adjusting the power consumption of the one or more components in the system comprises when the current level of power consumption of the system is below the low threshold, allowing the power consumption of the one or more components in the system to increase by at least one power consumption level while the current level of power consumption of the system is below the high threshold;
   when the current level of power consumption of the system is above the high threshold, decreasing the power consumption of the one or more components in the system by at least one power consumption level while the current level of power consumption of the system is above the high threshold; and
   wherein the one or more components include a redundant component.

7. A system, comprising:
   one or more components capable of operating at different power consumption levels;
   a power supply to provide power to the one or more components;
   logic to provide a current level of power consumption of the system; and a power consumption controller coupled to the power supply and coupled to the one or more components, the power consumption controller is to adjust the power consumption of the one or more components by one power consumption level or by multiple power consumption levels during a first time period when the current level of power consumption of the system exceeds a power hysteresis;

wherein the power hysteresis includes a high threshold and a low threshold, and wherein the power consumption controller is to adjust the power consumption of the one or more components by decreasing their power consumption when the current level of power consumption of the system is above the high threshold and by allowing their power consumption to increase when the current level of power consumption of the system is below the low threshold;

wherein the power consumption controller is to decrease the power consumption of the one or more components until the current level of power consumption of the system is below the high threshold;

wherein allowing increase in the power consumption includes allowing the power consumption of at least one component to increase to its highest level; and wherein the one or more components include redundant components.

8. A system, comprising:

logic to monitor a current level of power consumption of a system; and logic to adjust power consumption of a group of one or more components in the system by one power consumption level or by multiple power consumption levels at a time when the current level of power consumption exceeds a power hysteresis range;

wherein the group of one or more components includes at least one component that is capable of operating at different power consumption levels;

wherein the power hysteresis includes a high threshold and a low threshold, and wherein the logic to adjust the power consumption of the group of one or more components includes logic to allow increase in the power consumption of a component when the current level of power consumption of the system is below the low threshold and logic to decrease the power consumption of the component when the current level of power consumption of the system is above the high threshold; and wherein the group of one or more components include at least one redundant component.

* * * * *